United States Patent
Schuba et al.

(10) Patent No.: US 7,441,022 B1
(45) Date of Patent: Oct. 21, 2008

(54) RESOLVING CONFLICTS BETWEEN NETWORK SERVICE RULE SETS FOR NETWORK DATA TRAFFIC IN A SYSTEM WHERE RULE PATTERNS WITH LONGER PREFIXES MATCH BEFORE RULE PATTERNS WITH SHORTER PREFIXES

(75) Inventors: Christoph L. Schuba, Sandhausen (DE); Jason L. Goldschmidt, San Francisco, CA (US); Michael F. Speer, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 778 days.

(21) Appl. No.: 10/800,091

(22) Filed: Mar. 12, 2004

(51) Int. Cl.
*G06F 15/173* (2006.01)
(52) U.S. Cl. .......................... 709/223; 706/47; 709/222
(58) Field of Classification Search ................. 709/223; 706/47, 20; 370/389, 392, 229–331
See application file for complete search history.

(56) References Cited

U.S. PATENT DOCUMENTS

| | | | |
|---|---|---|---|
| 6,381,639 B1 * | 4/2002 | Thebaut et al. ............. | 709/222 |
| 6,651,096 B1 * | 11/2003 | Gai et al. .................... | 709/223 |
| 6,910,028 B2 * | 6/2005 | Chan et al. ................... | 706/47 |
| 6,980,555 B2 * | 12/2005 | Mar ....................... | 370/395.21 |
| 7,116,663 B2 * | 10/2006 | Liao ........................... | 370/392 |
| 7,139,817 B1 * | 11/2006 | English et al. ............. | 709/220 |
| 2002/0009076 A1 * | 1/2002 | Engbersen et al. ......... | 370/389 |
| 2003/0182279 A1 * | 9/2003 | Willows ....................... | 707/4 |

* cited by examiner

*Primary Examiner*—William C. Vaughn, Jr.
*Assistant Examiner*—Greg Bengzon
(74) *Attorney, Agent, or Firm*—Park, Vaughn & Fleming, LLP

(57) ABSTRACT

One embodiment of the present invention provides a system that resolves conflicts between network service rules for network data traffic in a system where rule patterns with longer prefixes match before rule patterns with shorter prefixes. The system operates by receiving a set of network service rules for network data traffic from multiple network services, wherein network service rules from different network services can possibly conflict. Each of these network service rules specifies: a filter that defines a prefix for a set of packets in the packet flow, and an action list that specifies one or more actions to be applied to the set of packets. Next, the system identifies a conflict between a higher priority rule and a lower priority rule in the set of network service rules. The system resolves this conflict by prepending an action list of the higher priority rule to an action list of a rule with a filter that defines a longer prefix.

24 Claims, 8 Drawing Sheets

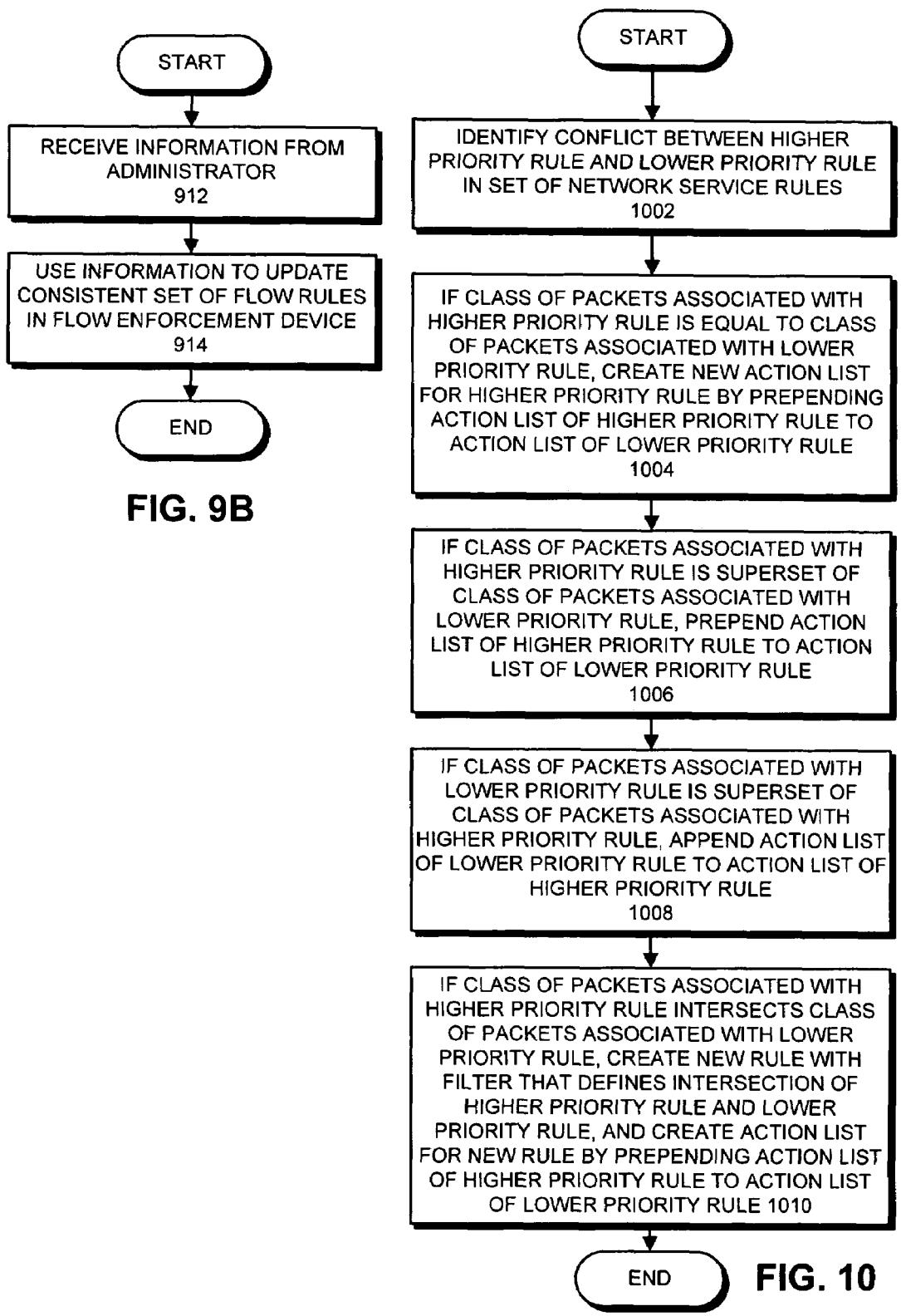

| $f \wedge f$ | EQUAL | SUBSET | SUPERSET | INTERSECT | DISJOINT |
|---|---|---|---|---|---|
| EQUAL | EQUAL | SUBSET | SUPERSET | INTERSECT | DISJOINT |
| SUBSET | SUBSET | SUBSET | INTERSECT | INTERSECT | DISJOINT |
| SUPERSET | SUPERSET | INTERSECT | SUPERSET | INTERSECT | DISJOINT |
| INTERSECT | INTERSECT | INTERSECT | INTERSECT | INTERSECT | DISJOINT |
| DISJOINT | DISJOINT | DISJOINT | DISJOINT | DISJOINT | DISJOINT |

FIG. 12

RESOLVING CONFLICTS BETWEEN NETWORK SERVICE RULE SETS FOR NETWORK DATA TRAFFIC IN A SYSTEM WHERE RULE PATTERNS WITH LONGER PREFIXES MATCH BEFORE RULE PATTERNS WITH SHORTER PREFIXES

RELATED APPLICATION

The subject matter of this application is related to the subject matter in a co-pending non-provisional application by inventors Christoph L. Schuba, Santashil PalChaudhuri, Raphael J. Rom and Michael F. Speer, entitled "Method and Apparatus for Computing Priorities Between Conflicting Rules for Network Services," having Ser. No. 10/379,031, and filing date 3 Mar. 2003.

BACKGROUND

1. Field of the Invention

The present invention relates to the task of managing packet flows in a computer network. More specifically, the present invention relates to a method and an apparatus for resolving conflicts between network service rule sets for network data traffic in a system where rule patterns with longer prefixes match before rule patterns with shorter prefixes.

2. Related Art

Dramatic advances in networking technology presently make it possible to transfer data at bandwidths exceeding 2.5 gigabits per second across a single high-speed optical pipe. These high-speed pipes can be used to connect data centers to wide area networks and the Internet. In order to effectively use the bandwidth available through these high-speed pipes, edge devices within the data centers must be able to manage the packet flows received through these pipes. For example, an edge device can perform a number of operations related to managing network flows, such as performing firewall functions, service level agreement (SLA) monitoring, transport matching and load balancing. Performing these operations can be an extremely challenging task because the policies specifying how packet flows need to be modified as they are received at high transfer rates need to be managed. Furthermore, the devices used to perform the enforcement need to be constructed such that they scale to high data rates in a reliable fashion.

These operations are typically applied to packet flows in a pipelined fashion. For example, referring to FIG. 1, a packet flow received through high-speed pipe 102 feeds through a pipeline that includes a number of separate modules, including a firewall module 104, an SLA monitoring module 105, a transport matching module 106 and a load-balancing module 107. The output of this pipeline feeds through a switch 108, which switches packets to various servers 110-112 within the data center. This pipelined architecture allows the modules to operate sequentially on the packet flow. However, passing the packet flow through multiple pipeline stages increases latency, which can adversely affect performance for many applications.

Note that each of these pipeline modules can conceptually be divided into three components: (1) a classifier and dispatch component; (2) a module-specific component that directly operates on the packets in the packet flow; and (3) a management and administration component that generates rules for the classifier and dispatch component. (Note that the classifier and dispatch component and the module-specific component are collectively referred to as the "data plane," whereas the management and administration component is referred to as the "control plane"). In this way, the high-speed classification and dispatch operations performed by the data plane can be separated from the management and administration functions performed by the control plane. FIG. 2 illustrates how the modules in FIG. 1 can be separated into separate control plane and data plane modules.

A standardized interface is being developed to facilitate this separation. In particular, see the paper entitled "Open Standards for the Control and Forwarding Planes in Network Elements," by Lily L. Yang, Ram Gopal and Susan Hares, which describes an early attempt to standardize the interface between the control and forwarding planes. A standardized interface allows system vendors to use components from different suppliers to perform these control and forwarding functions.

In order to provide additional performance, a number of pipelines can operate in parallel. For example, referring to FIG. 3, the packet flow from high-speed pipe 102 is routed into three parallel pipelines by fan out module 300. The outputs of these pipelines feed into switch 108, which switches packets from the pipelines to various servers 110-112 within the data center.

Providing parallel pipelines can improve performance if the packet stream can be divided into separate flows for the different pipelines. However, it does not help if the packet stream contains only a single flow. Moreover, this technique does not reduce the number of pipeline stages, and consequently does little to reduce latency.

In order to solve the above-described problems, it is desirable to collapse the various operations related to managing network flows into a single flow classification and dispatch step. This reduces the latency involved in applying the operations to the packet flow in pipelined fashion as is illustrated in FIGS. 1-3. However, in order to collapse the operations in this way, it is necessary to resolve conflicts between rules for the various network services, such as load balancing and firewall services. (These rules will be subsequently referred to as "network service rules.").

The conflict resolution process is complicated by the fact that existing packet-processing hardware is designed so that rule patterns with longer prefixes match before rule patterns with shorter prefixes. This generally makes sense because a rule with a longer prefix applies to a more-specific set of packets, and is hence likely to take precedence over a more general rule that applies to a larger set of packets. However, in some cases it is desirable for a rule with a shorter prefix to have a higher priority than a rule with a longer prefix. For example, it is typically desirable for rule that originates from a firewall service, which filters out potentially malicious packets, to have a higher priority than a rule that originates from a load-balancing service, even if the rule for the load-balancing service has a longer prefix.

Hence, what is needed is a method and an apparatus that resolves conflicts between network service rules for network data traffic in a system where rule patterns with longer prefixes match before rule patterns with shorter prefixes.

SUMMARY

One embodiment of the present invention provides a system that resolves conflicts between network service rules for network data traffic in a system where rule patterns with longer prefixes match before rule patterns with shorter prefixes. The system operates by receiving a set of network service rules for network data traffic from multiple network services, wherein network service rules from different network services can possibly conflict (i.e. their patterns are identifying the same flows). Each of these network service rules specifies: a filter that defines a prefix for a set of packets in the packet flow, and an action list that specifies one or more actions to be applied to the set of packets. Next, the system identifies a conflict between a higher priority rule and a lower priority rule in the set of network service rules. The system resolves this conflict by prepending an action list of the higher priority rule to an action list of a rule with a filter that defines a longer prefix.

In a variation on this embodiment, if the set of packets associated with the higher priority rule is equal to the set of packets associated with the lower priority rule, resolving the conflict involves creating a new action list for the higher priority rule by prepending the action list of the higher priority rule to the action list of the lower priority rule.

In a variation on this embodiment, if the set of packets associated with the higher priority rule is a superset of the set of packets associated with the lower priority rule, resolving the conflict involves creating a new action list for the lower priority rule by prepending the action list of the higher priority rule to the action list of the lower priority rule.

In a variation on this embodiment, if the set of packets associated with the lower priority rule is a superset of the set of packets associated with the higher priority rule, resolving the conflict involves creating a new action list for the higher priority rule by prepending the action list of the higher priority rule to the action list of the lower priority rule.

In a variation on this embodiment, if the set of packets associated with the lower priority rule intersects the set of packets associated with the higher priority rule, resolving the conflict involves creating a new rule with a filter that defines the intersection of the set of packets associated with lower priority rule and the set of packets associated with the higher priority rule. It also involves creating an action list for the new rule by prepending the action list of the higher priority rule to the action list of the lower priority rule.

In a variation on this embodiment, prior to modifying a rule in the set of network service rules, the system clones the rule to ensure that potential conflicts with rules that appear later in the set of network service rules are not overlooked.

In a variation on this embodiment, the priority of a given rule can be based upon: a priority associated with a network service from which given rule originated; a count of the number of prefix bits specified by the filter for the given rule; and a time stamp indicating when the given rule was incorporated into the set of network service rules.

In a variation on this embodiment, an action specified by a network service rule can include: dropping a packet, gathering statistical information about the packet, controlling timer functions associated with the packet, modifying the packet, or passing the packet on.

In a variation on this embodiment, the multiple network services can include: a firewall service, a service level agreement monitoring service, a load balancing service, a transport matching service, a failover service, and a high availability service.

BRIEF DESCRIPTION OF THE FIGURES

FIG. 9B presents a flow chart illustrating how information from an administrator is used to update flow rules in accordance with an embodiment of the present invention.

FIG. 10 presents a flow chart illustrating how conflicts between network service rules are detected and resolved in accordance with an embodiment of the present invention.

FIG. 12 presents a conflict relationship table in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Flow Manager Architecture

Figure 1:
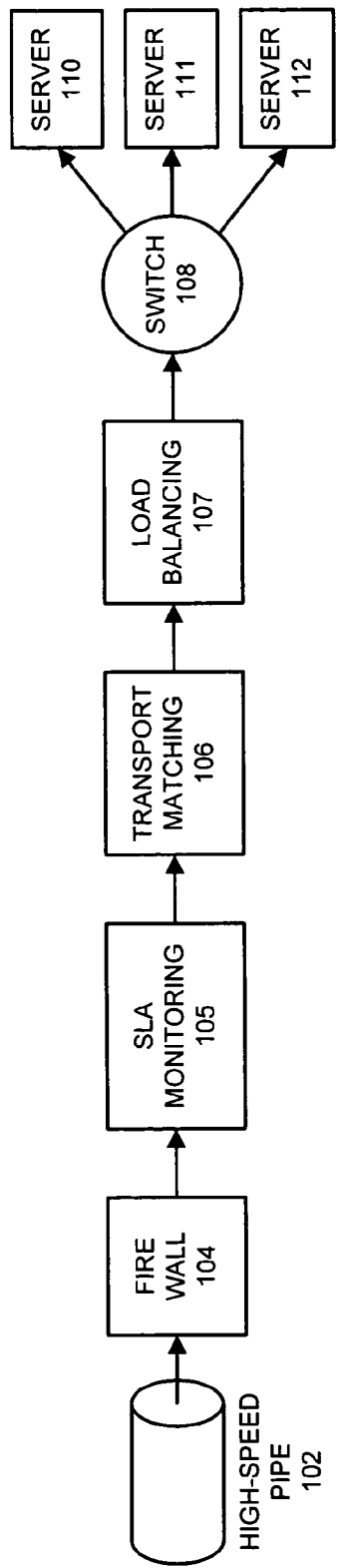
FIG. 1 illustrates a pipeline containing network service modules.
Figure 2:
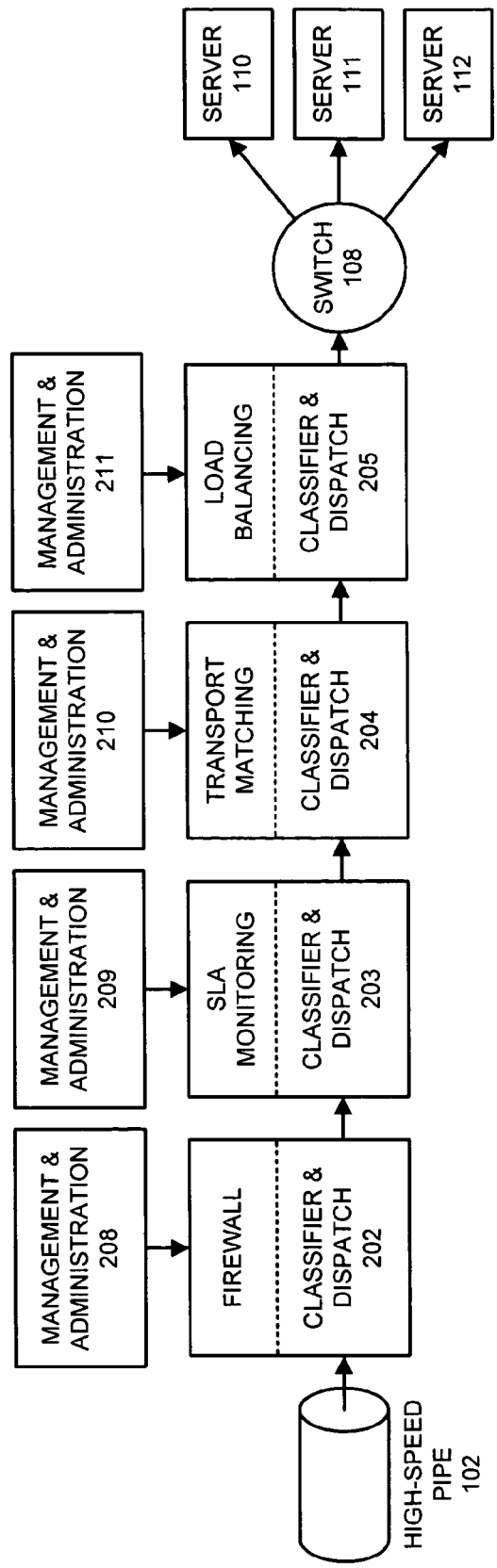
FIG. 2 illustrates a pipeline containing network service modules with separate components for management and classification/dispatch in accordance with an embodiment of the present invention.
Figure 3:
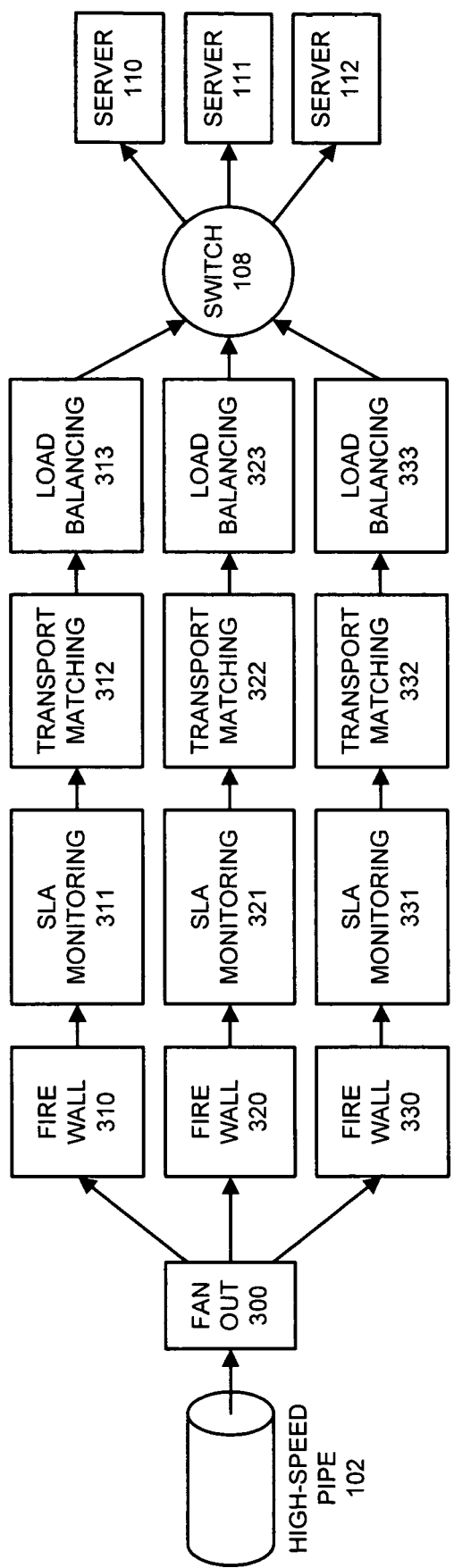
FIG. 3 illustrates a set of parallel pipelines containing network service modules.
Figure 4:
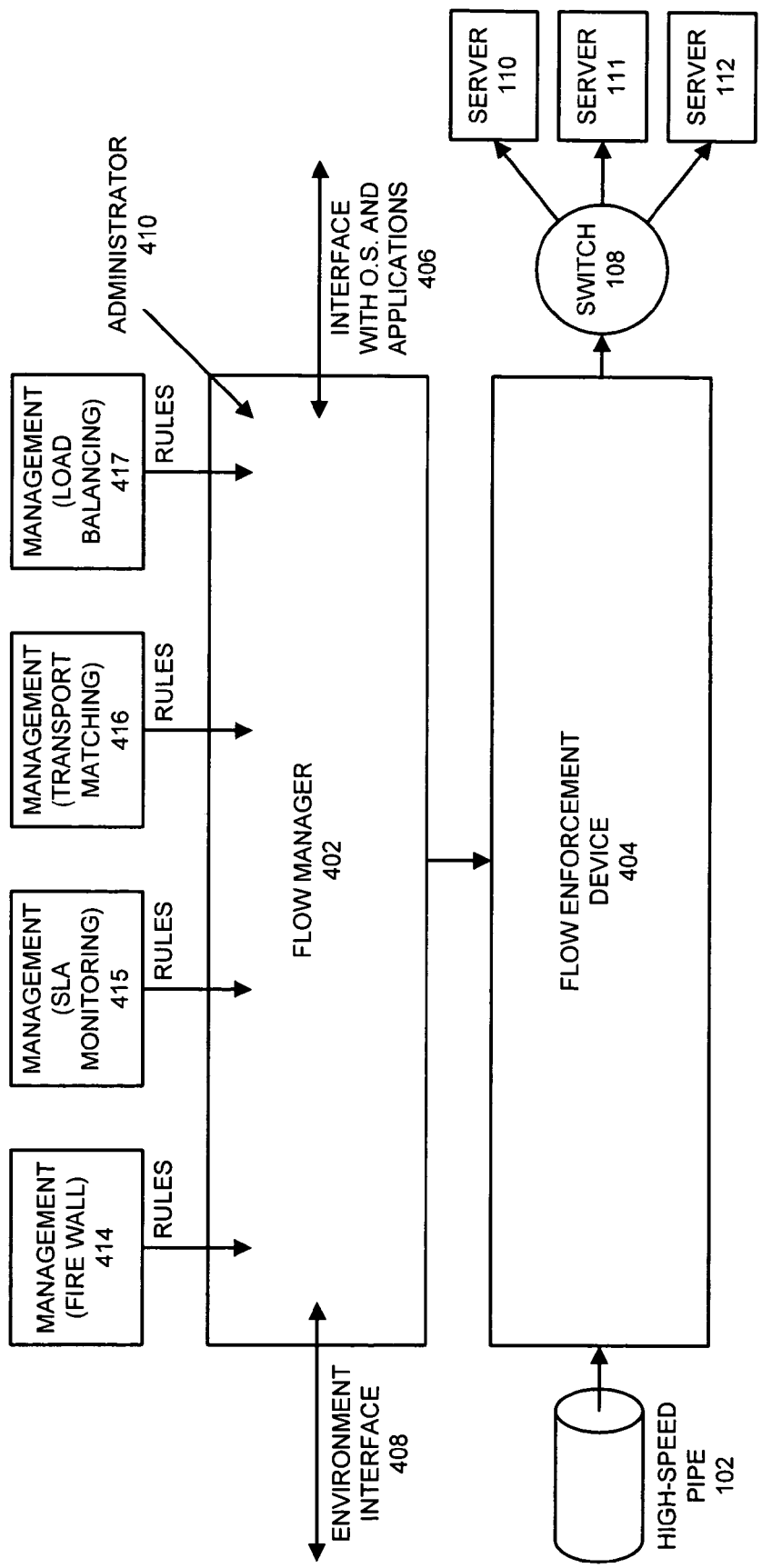
FIG. 4 illustrates an architecture that handles packet flows in accordance with an embodiment of the present invention.

FIG. 4 illustrates an architecture that handles packet flows in accordance with an embodiment of the present invention. This architecture includes flow manger 402 and flow enforcement device 404. During operation, flow enforcement device 404 receives packets from high-speed pipe 102 and routes the packets through switch 108 to servers 110-112. Flow enforcement device 404 can also perform simple operations on the packets, such as translating packet headers.

Flow manager 402 generates a consistent set of rules for flow enforcement device 404 based on rules received from various components. For example, FIG. 4 illustrates an exemplary set of components, including firewall management component 414, SLA monitoring component 415, transport matching management component 416 and load balancing management component 417. Note that this exemplary set of components is provided for purposes of illustration only. In general, the system can include many other different types of components. Also note that rules from different components can potentially conflict.

Firewall management component 414 provides various security features associated with firewall functions performed by the edge device. For example, firewall management component 414 can implement an access control policy that only allows specific packets to reach servers 110-112.

SLA monitoring component 415 provides various services associated with monitoring service level agreements for customers that make use of servers 110-112.

Transport matching management component 416 matches a network flow with an underlying transport protocol. Note that communications coming into a data center are typically TCP/IP traffic. Furthermore, the source of a communication assumes that the destination is speaking the same protocol. However, a data center may choose to use a different protocol within its own walls for reasons of efficiency or backward compatibility. For example, some companies are presently talking about using Infiniband (IB) within a server cluster. For this to work, some mechanism has to terminate the TCP flow and initiate an IB flow within the cluster. This process is known as "transport matching."

Load balancing management component 417 routes packets to servers 110-112 in a manner that balances load between servers 110-112. For example, if one server is heavily loaded, load balancing management component 417 can route a new flow to a less loaded server.

Flow manager 402 can also receive input from other sources. (1) Flow manager 402 can receive commands from an administrator specifying, for example, how to route specific flows and how to prioritize network services. (2) Flow manager 402 can receive input from an environment interface 408 that communicates with environment agents. (3) Flow manager can also receive input from another interface 406 that communicates with an operating system and applications running on servers 110-112.

Flow manager 402 considers these inputs and rules in creating a single consistent set of flow rules in a low-level form that can be used by flow enforcement device 404. In one embodiment of the present invention, each of the low-level flow rules specifies a filter that defines a set of packets in the packet flow as well as a list of actions to be applied to the set of packets. In this way, the filter can be used to identify packets that the flow rule applies to, and the actions can be applied to the identified packets. In one embodiment of the present invention, flow enforcement device 404 is configured so that rule patterns with longer prefixes match before rule patterns with shorter prefixes.

Figure 5:
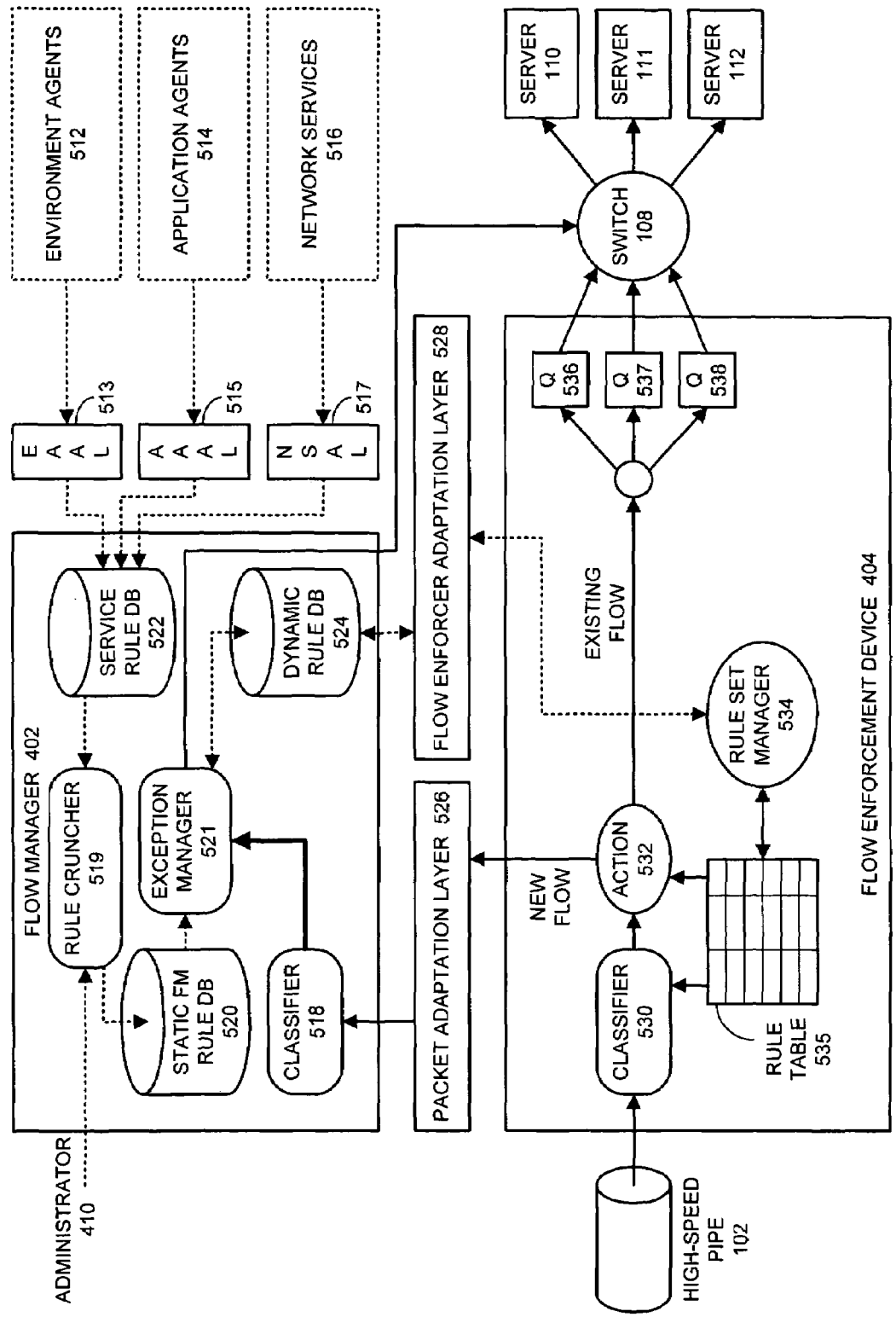
FIG. 5 presents a more-detailed view of the flow manager architecture illustrated in FIG. 4 in accordance with an embodiment of the present invention.

FIG. 5 presents a more-detailed view of the flow manager architecture illustrated in FIG. 4 in accordance with an embodiment of the present invention. In FIG. 5, flow manager 402 receives inputs from environment agents 512 through environment agent adaptation layer (EAL) 513. Environment agents 512 can for example provide information on the time of day, which allows rules to change depending upon the time of day. Environment agents 512 can also provide information on current network traffic, which may, for example, indicate that a denial of service attack is taking place.

Flow manager 402 also receives input from application agents 514 through application agent adaptation layer (AAL) 515. Application agents 514 can provide information from an operating system or application running on servers 110-112. For example, an application can indicate that a customer has provided a credit card number to a web site, thereby indicating that the customer is a paying client, as opposed to someone who is merely browsing through the web site. This may cause flow manager 402 to give network flows from the customer a better level of service.

Flow manager 402 also receives rules from various network services 516 through network service adaptation layer 517. As in FIG. 4, these network services can include management component 414, SLA monitoring component 415, transport matching management component 416 and load balancing management component 417.

Flow manager 402 uses inputs received from environment agents 512, application agents 514 and network services 516 to create and/or modify rules in service rule database 522.

Rule cruncher 519 combines rules from service rule database 522 and input from administrator 410 to produce rules that are stored in static flow manager (FM) rule database 520. These rules are subsequently fed through exception manager 521, which generates rules for new flows. The resulting rules are stored in dynamic rule database 524.

Flow enforcement device 404 includes rule set manager 534, which retrieves rules through flow enforcement adaptation layer 528 and uses the rules to populate rule table 535. Flow enforcement device 404 also includes classifier 530, which uses filters from rule table 535 to identify packets associated with specific rules.

Once packets are identified, specified actions are applied to the packets by action module 532. In doing so, action module 532 feeds flows into a number of queues 536-537, which feed into switch 108. Action module 532 can perform a number of actions on packets, such as, dropping packets, translating headers of packets, and inserting metadata into packets.

If action module 532 encounters a packet that does not match any of the existing filters, the packet is part of a new flow. Information associated with the packet feeds through packet adaptation layer 526 into classifier 518 within flow manager 402. The default behavior is to forward to packet to exception manager 521, which generates rules for the new flow. These rules are stored in dynamic rule database 524 and are used to populate rule table 535 within flow enforcement device 404.

Operation of Flow Manager

Figure 6:
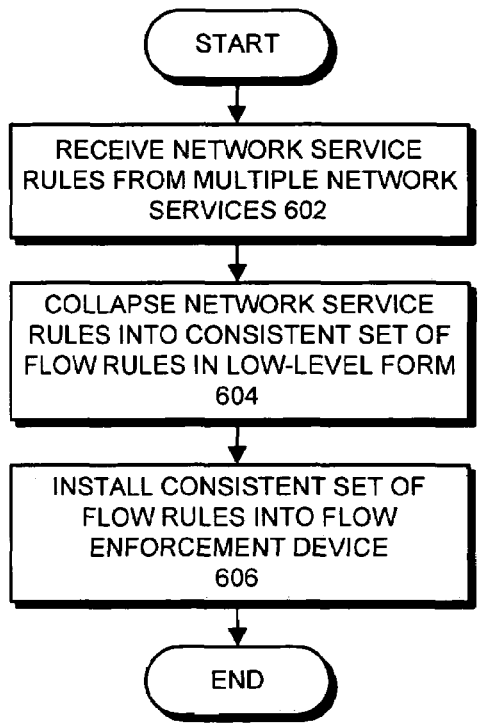
FIG. 6 presents a flow chart illustrating the operation of the flow manager in accordance with an embodiment of the present invention.

FIG. 6 presents a flow chart illustrating the operation of flow manager 402 in accordance with an embodiment of the present invention. Upon receiving rules from multiple network services (step 602) (as well as input from environment agents 512, application agents 514 and administrator 410), rule cruncher 519 collapses the rules into a consistent set of flow rules in a low-level form suitable for use by flow enforcement device 404 (step 604).

In one embodiment of the present invention, the task of collapsing the rules involves identifying conflicts between rules and assigning different priorities to the conflicting rules. This allows higher priority rules to be applied before lower priority rules. For example, firewall rules can be given a higher priority than load balancing rules, because the firewall rules ensure security of the datacenter, whereas the load balancing rules merely improve server utilization.

The resulting rules are stored into rule table 535 within flow enforcement device 404 (step 606), and are subsequently used in processing packets received through high-bandwidth pipe 102.

New Flow

Figure 7:
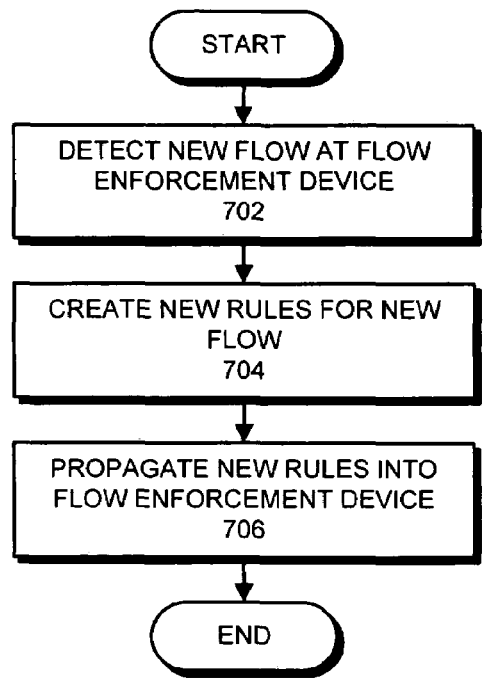
FIG. 7 presents a flow chart illustrating how a new flow is handled in accordance with an embodiment of the present invention.

FIG. 7 presents a flow chart illustrating how a new flow is handled in accordance with an embodiment of the present invention. The process starts when a new flow is detected at flow enforcement device 404 (step 702). This detection can occur, for example, when a received packet does not match any existing templates in rule table 535. This new flow is communicated to classifier 518 within flow manager 402. The output of classifier 518 is used by exception manager 521 to produce new rules for the new flow (step 704). These new rules are then integrated into the consistent set of rules stored in dynamic rule database 524, which allows them to be propagated into rule table 525 within flow enforcement device 404 (step 706).

Updating Flow Rules

Figure 8:
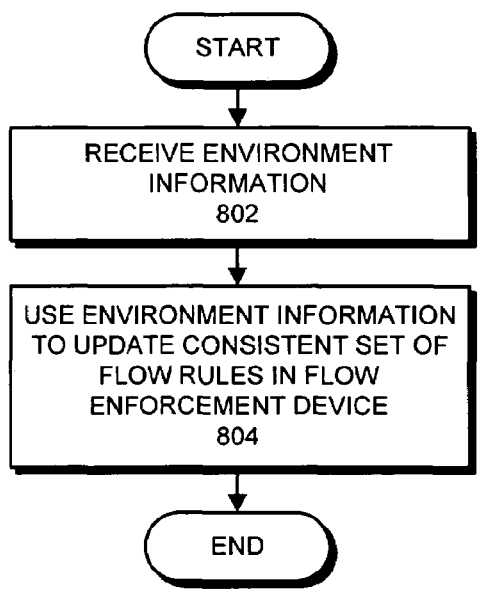
FIG. 8 presents a flow chart illustrating how environment information is used to update flow rules in accordance with an embodiment of the present invention.

FIG. 8 presents a flow chart illustrating how environment information is used to update flow rules in accordance with an embodiment of the present invention. Upon receiving environment information from environment agents 512 (step 802), the system uses the environment information to update the flow rules in rule table 535 within flow enforcement device 404 (step 804). This involves updating rules in service rule database 522, static flow manager rule database 520 and dynamic rule database 524 as is described above with reference to FIG. 5.

Figure 9A:
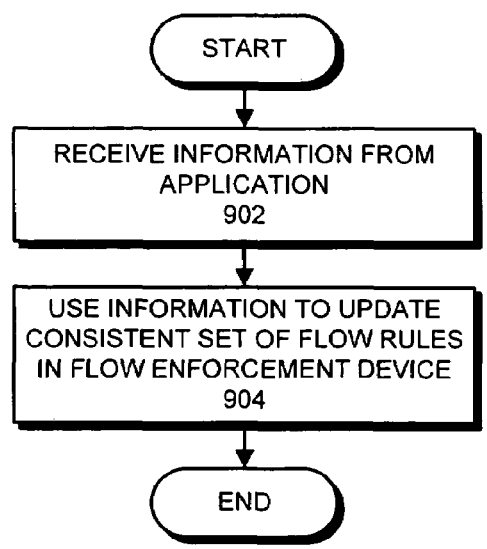
FIG. 9A presents a flow chart illustrating how information from an application is used to update flow rules in accordance with an embodiment of the present invention.

FIG. 9A presents a flow chart illustrating how information from an application is used to update flow rules in accordance with an embodiment of the present invention. Upon receiving new information from an application or operating system from application agents 514 (step 902), the system uses the information to update the flow rules in rule table 535 within flow enforcement device 404 (step 904). As above, this involves updating rules in service rule database 522, static flow manager rule database 520 and dynamic rule database 524.

FIG. 9B presents a flow chart illustrating how information from an administrator is used to update flow rules in accordance with an embodiment of the present invention. Upon receiving new information from an administrator 410 (step 912), the system uses the information to update the flow rules in rule table 535 within flow enforcement device 404 (step 914). This involves updating static flow manager rule database 520 and dynamic rule database 524.

Rule Cruncher

We now describe a technique that collapses large sets of conflicting data traffic flow rules into a consistent set of longest prefix matching (LPM) rules to be enforced efficiently by network processors (NPU) or flow enforcement devices (FED.) The technique, called the "longest prefix rule cruncher" (lprc), determines if multiple rules are to be applied to the same traffic flows. If so, it constructs a rule set that uniquely identifies such traffic flows for which common sets of actions are to be applied (using longest prefix matching) and expresses priority through the order in which these actions are to be applied to the individual traffic flows.

This technique creates one set of longest prefix FED rules in one sweep, given an entire rule data base. Said rule set can be used to configure network processors or flow enforcement devices that employ longest prefix matching (LPM).

As input, a longest prefix rule cruncher technique accepts rules from external entities, such as tier 0 network services (including, but not limited to firewall, load-balancing, fail over, and service level agreement monitoring) or application agents, and policies, such as priorities between network services. The purpose of the rule cruncher is to create a set of low level rules that can be enforced by high performance network processors that operate in the FED on the data path. To accomplish this goal, the rule cruncher determines if rules are conflicting, i.e., if they are to be applied to multiple traffic flows. If they do conflict, the technique determines which rule has priority. It then creates a set of longest prefix matching rules with possibly modified action lists that accurately enforce the desired priority of actions for any given traffic flow.

TERMINOLOGY AND DEFINITIONS

Different network services act on incoming packets and perform various actions. In one embodiment of the architectural model, network services inform the flow manager which actions the flow enforcement device is supposed to perform on which packet. This communication is in the form of "rules." To be precise and facilitate the understanding of the technique description later, we first describe our terminology in more detail.

Rules, Filters, and Actions

A Rule is composed of a tuple, a Filter and an Actionlist, where the Filter defines a set of packets on which an operation defined by Action is to be performed. We denote that as Rule := <Filter, Actionlist>

Typical Actions are, for example, dropping a packet, gathering statistical information, controlling timer functions, modifying (a.k.a. marking) a packet with meta-data (e.g., inserting new fields or overwriting existing fields), or passing the packet on (i.e., doing nothing). This list is not exhaustive.

Actionlist := <Action>^+

Action := Insert | Overwrite | Delete | Gather statistics | Control timer functions | Checksum calculation | Hash calculation | Drop | Output | Update rule | Message host | Pass Each Filter identifies patterns for various fields that data packets are matched against. Each Filter is therefore composed of possibly several Field Filters.

Filter := <Field-Filter>^+

Field-Filter := <Field-Name, Pattern>

Each Field-Filter contains a Field Name and a Pattern. The Field Name identifies (in a one-to-one correspondence) the possibly masked, header field in a Protocol Layer. For example, in the IP (Network) layer a field name can be IP source address, the last 4 bits of the IP destination address, etc. Each Pattern is composed of a bit string to determine which packets match this field. The bit-string consists of set bits (1), clear bits (0), and do-called "don't care" bits (d).

Matching

Given p.field.value, the value of a specific field in a data packet p, we say that the field is matched, if all set and clear bits in the field pattern exactly match, while in the locations of don't care bits either clear or set bits can occur.

We say that a "packet matches a filter" if all its fields are matched by the filter. We say a "packet matches a rule," if it matches the rule's filter.

For example, the Field <IP-source-address, 128.12.30.151> matches all packets p whose IP source address is 128.12.30.151. The Field <IP-source-address, 128.12.*.*> matches all packets in the 16-bit masked subnet 128.12. Note that each star symbol "*" here denotes 8 consecutive "don't care" bits. A different notation for specifying don't care bit masks that are contiguous, and right-aligned lists the number of don't care bits following the IP address, separated by the slash symbol. For example, 128.12.30.151/16 denotes that the rightmost 16 bits in the IP address can be anything. In fact, the two examples 128.12.30.151/16 and 128.12.255.255/16 denote the identical pattern 128.12.*.*.

Rule Conflicts and Relationships

In a running system, there are many rules concurrently present and active in the Flow Manager. Because these rules stem from various applications (or even similar applications on different hosts) a packet could be the subject of actions of more than a single rule. We call this occurrence a "rule conflict."

We express how rules conflict in the following way. Given two rules r and r', we can define two sets S and S' of packets. Set S (S') contains exactly those packets that match rule r (r'). We can now consider the set relationship between S and S'. They can either be disjoint (DISJOINT), identical (EQUAL), they can intersect (INTERSECT), S can contain S' (SUPERSET), or S can be contained by S' (SUBSET).

We use these same terms to describe the relationship between rules r and r', or more detailed between two protocol-filters or two field-filters. So, for example, if no possible packet can match both rules r and r', then the relationship between r and r' is DISJOINT. If rule r is identical to rule r' but specifies one additional field filter that was not specified for rule r', then r is more specific than r' and the relationship between r and r' is SUBSET.

Problem Statement and Contribution

Depending on the type of actions specified, all or just a subset of these actions may need to be performed on the same packet.

The Flow Manager needs a mechanism to correctly and efficiently sort these out such that packets that match multiple rules are acted upon in the correct order.

To that end, the flow Manager creates a rule set (maintained in a Rule Database, short RuleDB) in which priority is expressed through the concept of longest prefix matching, in combination with the correct ordering of the associated action lists. Rules with a longer prefix match and are applied before those with a shorter prefix. If rules with a shorter prefix have a higher priority than rules with a longer prefix, their action-lists are arranged such as to express the order of preference (i.e., the order in which their actions need to be applied.)

We present a technique that first detects if rules conflict, and for conflicting rules, modifies the rules such that policy-based rule priorities are enforced through a combination of longest prefix matching and action list reordering.

Rule Cruncher Techniques

The goal of rule cruncher techniques is to take inputs (rules) from multiple sources and to generate a consistent rule database that is conflict free and consumable by Flow Enforcement Devices. "Conflict-free" means that possible conflicts for every two conflicting rules are clearly resolved according to the priority policy. "Consumable by Flow Enforcement Devices" means that priorities are expressed via longest prefix matching, a mechanism that is prevalent in many NPUs or FEDs on the market today, as well as in the currently evolving Network Processing Forum standards.

FED implementations that use integer priority values to express priority between conflicting rules have an inherent limitation that no technique can overcome: it is possible that more rules are directly dependent on each other than there are possible priority values. The solution we are presenting in this work does not have that limitation, because priorities are expressed through longest prefix matching and through the order of action lists.

We use the term vertex to refer to the data structure encoding a rule. It consists of a pattern and an action list.

The Longest Prefix Rule Cruncher Technique

Input/Output Parameters for LongestPrefixRuleCruncher( )

Note that we use the term ""vertex" to refer to the data structure in the technique that represents a rule.

The offline longest prefix rule cruncher technique operates on two input parameters:

SRDB: a set of rules, we call the service rule data base. It contains all rules collected from the various Tier 0 services.

Note that the policy specifying which service has higher priority than another service is already part of the vertex data structure.

The technique's output is:

RDB: a set of rules, we call the rule data base. These rules represent the aggregation of the rules in the SRDB.

High-Level Description of the Longest Prefix Rule Cruncher Technique

The technique starts with an empty rule set, called the CRDB (crunched rule data base), subsequently removing vertices from the SRDB and adding them to the CRDB, until there are no more rules to move. Every vertex that is moved from the SRDB to the CRDB is compared with all vertices already in the CRDB to detect conflicts (Method DetermineMatchRel( )). Every EQUAL, INTERSECT, SUBSET, or SUPERSET conflict is resolved in a method called ResolveConflict( ).

Note that these data bases must be traversed (both FOREACH loops) in a particular priority order to ensure the correctness of the technique. The first two tie breakers for both SRDB and CRDB are identical: firstly, vertices with higher service priority come before vertices with lower service priority and secondly, vertices with a longer prefix come before vertices with a shorter prefix. If both, service priority and prefix length of two vertices are identical, the SRDB breaks the tie by choosing the lexicographical ordering, while the CRDB selects the vertex with a smaller precedence value first. Precedence values are assigned as part of the conflict resolution.

When the technique terminates, the RDB contains the resolved set of low-level rules that can be 1:1 translated into the FED-specific format.

Pseudo Code for Longest Prefix Rule Cruncher Technique

```
0  RuleSet <- LPRC(RuleSet srdb) {
1    NEW RuleSet crdb;
2    FOREACH Vertex v IN srdb DO { // Vertex == Rule
3      FOREACH vl IN crdb DO {
4        MatchRelationship mrel=v.DetermineMatchRel (vl);
5        SWITCH (mrel) {
6          CASE DISJOINT: BREAK;
7          CASE EQUAL, INTERSECT, SUBSET,
               SUPERSET:
8            ResolveConflict(v, vl, v, vl, mrel, crdb);
9            BREAK;
10       } }
11     crdb.add(v);
12   }
13   return crdb;
14 }
```

The Determine Match Relationship Technique

Input/Output Parameters for DetermineMatchRel( )

The determine match relationship technique operates on two input parameters:

v, vl: two vertices for which we want to decide if the rules they represent conflict, and if so, what their matching relationship is.

The technique's output is
mrel: the match relationship of the two rules represented by the input parameters.

High-Level Description of the Determine Match Relationship Technique

The determine match relationship technique is designed to determine if two rules conflict, and if they do, in which way their specific filter instantiations conflict. If they do not conflict, we say they are DISJOINT, if they do conflict, they can be identical (EQUAL), one can be a subset (SUBSET) or superset (SUPERSET) of the other, or they can conflict for a subset of packets (INTERSECT).

Pseudo-Code for the Determine Match Relationship Technique

First referring to the table that appears in FIG. 12. Column 1 depicts the 5 possible relationships, same as Row 1. The two fields are ANDed in the table. It can be seen that EQUAL is the identity element in the composition. EQUAL AND X=X. It can also be seen that DISJOINT is zero-element. DISJOINT AND X=DISJOINT. As the composition is commutative, the table can be depicted as triangular one.

It is observed that the composition of these relationships are:
REFLEXIVE: X AND X = X
COMMUTATIVE: X AND Y = Y AND X
ASSOCIATIVE: ((X AND Y) AND Z)=(X AND (Y AND Z))

This associativity property is particularly important as we use it extensively in the DetermineMatchRel technique to accumulate the relationship results.

```
0 matchRel mrel
1 <- DetermineMatchRel(vertex a, vertex b) {
2
3 IF (there exist non-corresponding filter-fields) {
4 RETURN (INTERSECT)
5 } ELSE {
6 mrel := EQUAL;
7 }
8 FOREACH pair of corresponding filter-fields
9 a.rule.f and b.rule.f {
10 mrel':=DetermineFieldMatchRel(a.rule.f,b.rule.f)
11 IF ((mrel') == DISJOINT) {
12 RETURN (DISJOINT);
13 } ELSE {
14 mrel=CombineFieldMatchRel(mrel, mrel');
15 }
16 }
17 RETURN (mrel);
18 }
```

Function DetermineMatchRel( ) immediately returns the value INTERSECT if the two rules have no corresponding filter fields, because in that case there can be packets that match exactly one of the two filters and packets that match both filters [11.3-4].

If corresponding filter-fields exist, we initialize the temporary variable mrel to EQUAL, the zero-element [11.5-7].

In the following loop [11.8-15] the technique inspects each pair of corresponding filter fields and determines their individual field match relationship by calling function DetermineFieldMatchRel(a.rule.f, b.rule.f) [1.9]. If only a single one of those field match relationships is DISJOINT, we can terminate the loop and return DISJOINT as the accumulated result (see FIG. 12) because there cannot possible by two packets that fulfill the filter patterns of both rules [11.10-11]. Otherwise, we combine the currently cached result that's stored in mrel with the newly calculated result mrel' by calling function CombineFieldMatchRel(mrel, mrel') [1.13]. Its result is again assigned to mrel for the next iteration of the loop [1.13].

Finally, when the loop terminates naturally, the value of mrel is the result of matching and combining all corresponding filter fields and returned to the caller [1.16].

The Determine Field Match Relationship Technique

Input/Output Parameters for DetermineFieldMatchRel( )

The determine field match relationship technique operates on two input parameters:
f, g: two fields for which we want to decide if they conflict, and if so, what their matching relationship is.

The technique's output is:
mrel: the match relationship of the two fields represented by the input parameters.

Description of the Determine Field Match Relationship Technique

Given two fields, compare the significant bits of the two fields for a match. Only exact matches (EQ) are possible. Some bits, however, can be "don't care" (DC) bits, meaning that they match any pattern, independent of their value. Note that if DC bits occur in a pattern, they have to be contiguous, and they have to start from the least significant bit.

Pseudo-Code for the Determine Field Match Relationship Technique

```
0 matchRel mrel
1 <- DetermineFieldMatchRel(field f, field g) {
2
3 // perform data structure dependent match
4 }
```

This function is very data-structure-dependent and so simple to implement, that it does not need to be specified here. Therefore, we only present the function signature and leave the code section empty.

The Combine Field Match Relationship Technique

Input/Output Parameters for CombineFieldMatchRel( )

The combine field match relationship technique operates on two input parameters:
mrel, mrel': two match relationships that are to be combined according to the match table in FIG. 12.

The technique's output is
mrel: the combined match relationship.

High-Level Description of the Combine Field Match Relationship Technique

This technique consists of a simple table lookup to determine the relationship between two rules, given how they conflict. The table and its application were already described previously.

Pseudo-Code for the Combine Field Match Relationship Technique 0 matchRel mrel

1 <- CombineFieldMatchRel(matchRel mrel, matchRel mrel') {

2

3 static matchTable[5] [5] = {

4 {EQUAL , SUBSET , SUPERSET , INTERSECT, DISJOINT},

5 {SUBSET , SUBSET , INTERSECT, INTERSECT, DISJOINT},

6 {SUPERSET ,INTERSECT, SUPERSET , INTERSECT, DISJOINT},

7 {INTERSECT,INTERSECT, INTERSECT, INTERSECT, DISJOINT},

8 {DISJOINT , DISJOINT, DISJOINT , DISJOINT , DISJOINT},

9};

10 RETURN (matchTable[mrel] [mrel']);

11 }

This pseudo-code segment encodes the table FIG. 12 and illustrates how to access it to calculate field match combinations.

The Resolve Conflict Technique

Input/Output Parameters for ResolveConflict( )

The resolve conflict technique operates on six input parameters:

a, b: two vertices for which we want to represent the solution of their conflict
vl: the vertex with the lower priority
vh: the vertex with the higher priority
mrel: the match relationship between a and b.
crdb: the current CRDB The technique's output is
crdb: the modified crdb High-Level Description of the Resolve Conflict Technique This technique contains the gem of this invention. It encodes how priority resolutions can be expressed in a model where rules with longest prefix match first, while conflicting rules with shorter prefixes may have higher priority. The central idea is to modify the action list of the rule that has the longer prefix by prepending the actions of the rule with a higher priority.

Note that before modifying any vertex already present in the crdb, we clone it. This is necessary to ensure that no potential conflicts with vertices that appear later in the SRDB are missed.

Pseudo-Code for the Resolve Conflict Technique

```
0  RuleSet <- ResolveConflict(Vertex a, Vertex b,
1                  Vertex vl, Vertex vh,
2                  MatchRel mrel, RuleSet crdb) {
3      SWITCH (mrel)
4      CASE EQUAL:
5          clone vh; vh.A = vh.A|vl.A; delete(vl); BREAK;
6      CASE SUBSET:
7          ResolveConflict(b, a, vl, vh, SUPERSET, crdb);
```

-continued

Pseudo-Code for the Resolve Conflict Technique

```
8          RETURN;
9      CASE SUPERSET:
10         c = b.clone ( );
11         IF (b == vl)   THEN {c.A = vh.A|vl.A;}
12                        ELSE {vh.A = vh.A|vl.A;} BREAK;
13     CASE INTERSECT:
14         NEW intersection Vertex c with c.A=vh.A|vl.A;
15         BREAK;
16     }
17     RETURN crdb;
18 }
```

FIG. 10 presents a flow chart illustrating how conflicts between network service rules are detected and resolved in accordance with an embodiment of the present invention. This process takes place during step 604 in the flow chart illustrated in FIG. 6 (which is described above). The system starts by identifying a conflict between a higher priority rule and a lower priority rule in the set of network service rules (step 1002).

Next, if the set of packets associated with the higher priority rule is equal to the set of packets associated with the lower priority rule, the system resolves the conflict by creating a new action list for the higher priority rule by prepending the action list of the higher priority rule to the action list of the lower priority rule (step 1004).

On the other hand, if the set of packets associated with the higher priority rule is a superset of the set of packets associated with the lower priority rule, the system resolves the conflict by creating a new action list for the lower priority rule by prepending the action list of the higher priority rule to the action list of the lower priority rule (step 1006).

Similarly, if the set of packets associated with the lower priority rule is a superset of the set of packets associated with the higher priority rule, the system resolves the conflict by creating a new action list for the higher priority rule by prepending the action list of the higher priority rule to the action list of the lower priority rule (step 1008).

Finally, if the set of packets associated with the lower priority rule intersects the set of packets associated with the higher priority rule, the system resolves the conflict by creating a new rule with a filter that defines the intersection of the set of packets associated with lower priority rule and the set of packets associated with the higher priority rule. The system also creates an action list for the new rule by prepending the action list of the higher priority rule to the action list of the lower priority rule (step 1010).

Figure 11:
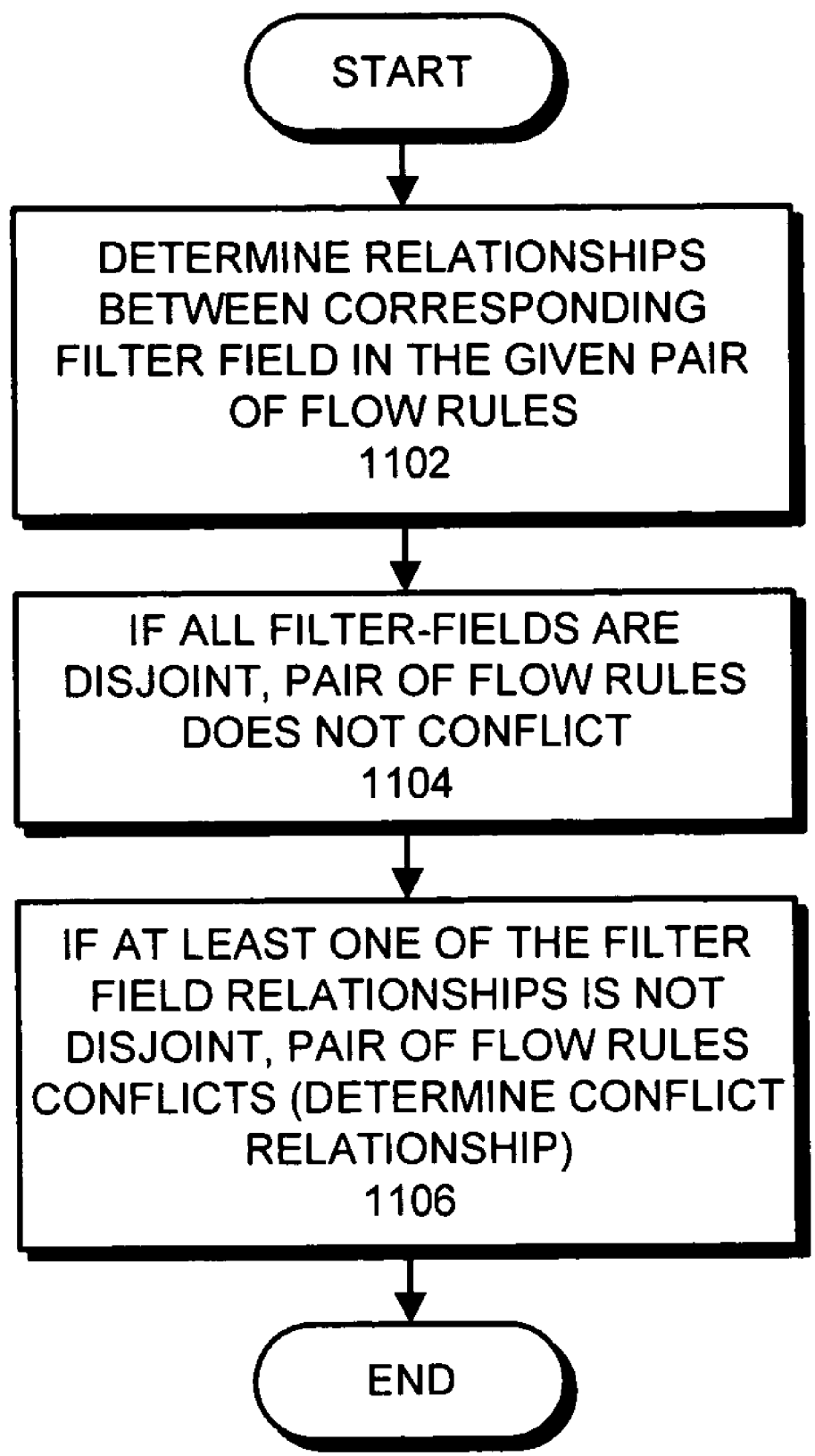
FIG. 11 illustrates how relationships are determined between filter-fields in accordance with an embodiment of the present invention.

FIG. 11 illustrates how relationships are determined between filter-fields in accordance with an embodiment of the present invention. This process takes place during step 1002 in the flow chart illustrated in FIG. 10 (which is described above). As described above, the system starts by determining relationships between corresponding filter fields in a pair of network service rules (step 1102). If all of the filter fields are disjoint, the pair of the rules does not conflict (step 1104). Otherwise, if at least one of the filter field relationships is not disjoint, the pair of network service rules conflicts. At this point, the system determines the conflict relationship between the conflicting network service rules (step 1106).

SUMMARY

This disclosure presents a technique that collapses large sets of conflicting data traffic flow rules into a consistent set of low-level rules to be enforced efficiently by network processors, or so called flow enforcement devices. This technique, called the "longest prefix rule cruncher," determines if rules are to be applied to multiple traffic flows, and if so, resolves such conflicts by first computing which rule has policy based priority, and then modifying their action lists if the lower priority rule would match first based on its longer prefix.

The priority policy is maintained implicitly through the appropriate ordering of the rules in the input rule set (srdb) and the intermediate result rule set (crdb). The resulting set of rules can be translated 1:1 into low level rules to be enforced by network processors or flow enforcement devices that employ longest prefix matching.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating high speed network packet flow by resolving conflicts between network service rules for network data traffic in a system where rule patterns with longer prefixes match before rule patterns with shorter prefixes, comprising:
   receiving one or more flows of packets;
   receiving a set of network service rules for network data traffic from multiple network services, wherein network service rules from different network services can possibly conflict;
   wherein each of the network service rules specifies, a filter that defines a prefix for a set of packets in the packet flow, and an action list that specifies one or more actions to be applied to the set of packets;
   identifying conflicts between higher priority rules and lower priority rules in the set of network service rules that are to be applied to packet flows;
   constructing a consistent set of network service rules with modified action lists, wherein each action list is modified by prepending an action list of the higher priority rule to an action list of a rule with a filter that defines a longer prefix, wherein if the set of packets associated with the higher priority rule is equal to the set of packets associated with the lower priority rule, constructing the set of networking service rules involves creating a new action list for the higher priority rule by prepending the action list of the higher priority rule to the action list of the lower priority rule; and
   applying the consistent set of rules to a switching mechanism to facilitate packet flow management.

2. The method of claim 1, wherein if the set of packets associated with the higher priority rule is a superset of the set of packets associated with the lower priority rule, resolving the conflict involves creating a new action list for the lower priority rule by prepending the action list of the higher priority rule to the action list of the lower priority rule.

3. The method of claim 1, wherein if the set of packets associated with the lower priority rule is a superset of the set of packets associated with the higher priority rule, resolving the conflict involves creating a new action list for the higher priority rule by prepending the action list of the higher priority rule to the action list of the lower priority rule.

4. The method of claim 1, wherein if the set of packets associated with the lower priority rule intersects the set of packets associated with the higher priority rule, resolving the conflict involves:
   creating a new rule with a filter that defines the intersection of the set of packets associated with lower priority rule and the set of packets associated with the higher priority rule; and
   creating an action list for the new rule by prepending the action list of the higher priority rule to the action list of the lower priority rule.

5. The method of claim 1, wherein prior to modifying a rule in the set of network service rules, the method further comprises cloning the rule to ensure that potential conflicts with rules that appear later in the set of network service rules are not overlooked.

6. The method of claim 1, wherein the priority of a given rule is based upon one or more of the following:
   a priority associated with a network service from which given rule originated;
   a count of the number of prefix bits specified by the filter for the given rule; and
   a time stamp indicating when the given rule was incorporated into the set of network service rules.

7. The method of claim 1, wherein an action specified by a network service rule can include, but is not limited to:
   dropping a packet;
   gathering statistical information about the packet;
   controlling timer functions associated with the packet;
   modifying the packet; and
   passing the packet on.

8. The method of claim 1, wherein the multiple network services can include, but is not limited to:
   a firewall service;
   a service level agreement monitoring service;
   a load balancing service;
   a transport matching service;
   a failover service; and
   a high availability service.

9. A computer-readable storage medium storing instructions that when executed by a computer cause the computer to perform a method for resolving conflicts between network service rules for network data traffic in a system where rule patterns with longer prefixes match before rule patterns with shorter prefixes, the method comprising:
   receiving one or more flows of packets;
   receiving a set of network service rules for network data traffic from multiple network services, wherein network service rules from different network services can possibly conflict;
   wherein each of the network service rules specifies, a filter that defines a prefix for a set of packets in the packet flow, and an action list that specifies one or more actions to be applied to the set of packets;
   identifying conflicts between higher priority rules and lower priority rules in the set of network service rules that are to be applied to packet flows; and
   constructing a consistent set of network service rules with modified action lists, wherein each action list is modified by prepending an action list of the higher priority rule to an action list of a rule with a filter that defines a longer prefix, wherein if the set of packets associated with the higher priority rule is equal to the set of packets associated with the lower priority rule, constructing the set of network service rules involves creating a new action list for the higher priority rule by prepending the action list of the higher priority rule to the action list of the lower priority rule.

10. The computer-readable storage medium of claim 9, wherein if the set of packets associated with the higher priority rule is a superset of the set of packets associated with the lower priority rule, resolving the conflict involves creating a new action list for the lower priority rule by prepending the action list of the higher priority rule to the action list of the lower priority rule.

11. The computer-readable storage medium of claim 9, wherein if the set of packets associated with the lower priority rule is a superset of the set of packets associated with the higher priority rule, resolving the conflict involves creating a new action list for the higher priority rule by prepending the action list of the higher priority rule to the action list of the lower priority rule.

12. The computer-readable storage medium of claim 9, wherein if the set of packets associated with the lower priority rule intersects the set of packets associated with the higher priority rule, resolving the conflict involves:
   creating a new rule with a filter that defines the intersection of the set of packets associated with lower priority rule and the set of packets associated with the higher priority rule; and
   creating an action list for the new rule by prepending the action list of the higher priority rule to the action list of the lower priority rule.

13. The computer-readable storage medium of claim 9, wherein prior to modifying a rule in the set of network service rules, the method further comprises cloning the rule to ensure that potential conflicts with rules that appear later in the set of network service rules are not overlooked.

14. The computer-readable storage medium of claim 9, wherein the priority of a given rule is based upon one or more of the following:
   a priority associated with a network service from which given rule originated;
   a count of the number of prefix bits specified by the filter for the given rule; and
   a time stamp indicating when the given rule was incorporated into the set of network service rules.

15. The computer-readable storage medium of claim 9, wherein an action specified by a network service rule can include, but is not limited to:
   dropping a packet;
   gathering statistical information about the packet;
   controlling timer functions associated with the packet;
   modifying the packet; and
   passing the packet on.

16. The computer-readable storage medium of claim 9, wherein the multiple network services can include, but is not limited to:
   a firewall service;
   a service level agreement monitoring service;
   a load balancing service;
   a transport matching service;
   a failover service; and
   a high availability service.

17. An apparatus that resolves conflicts between network service rules for network data traffic in a system where rule patterns with longer prefixes match before rule patterns with shorter prefixes, comprising:
   a receiving mechanism configured to receive one or more flows of packets;
   a receiving mechanism configured to receive a set of network service rules for network data traffic from multiple network services, wherein network service rules from different network services can possibly conflict;
   wherein each of the network service rules specifies, a filter that defines a prefix for a set of packets in the packet flow, and an action list that specifies one or more actions to be applied to the set of packets;
   a conflict detection mechanism configured to identify conflicts between higher priority rules and lower priority rules in the set of network service rules that are to be applied to packet flows; and
   a conflict resolution mechanism configured to resolve the conflict by constructing a consistent set of network service rules with modified action lists, wherein each action list is modified by prepending an action list of the higher priority rule to an action list of a rule with a filter that defines a longer prefix, wherein if the set of packets associated with the higher priority rule is equal to the set of packets associated with the lower priority rule, the conflict resolution mechanism is configured to:
      create a new action list for the higher priority rule by prepending the action list of the higher priority rule to the action list of the lower priority rule; and to
      delete the lower priority rule.

18. The apparatus of claim 17, wherein if the set of packets associated with the higher priority rule is a superset of the set of packets associated with the lower priority rule, the conflict resolution mechanism is configured to create a new action list for the lower priority rule by prepending the action list of the higher priority rule to the action list of the lower priority rule.

19. The apparatus of claim 17, wherein if the set of packets associated with the lower priority rule is a superset of the set of packets associated with the higher priority rule, the conflict resolution mechanism is configured to create a new action list for the higher priority rule by prepending the action list of the higher priority rule to the action list of the lower priority rule.

20. The apparatus of claim 17, wherein if the set of packets associated with the lower priority rule intersects the set of packets associated with the higher priority rule, the conflict resolution mechanism is configured to:
   create a new rule with a filter that defines the intersection of the set of packets associated with lower priority rule and the set of packets associated with the higher priority rule; and to
   create an action list for the new rule by prepending the action list of the higher priority rule to the action list of the lower priority rule.

21. The apparatus of claim 17, wherein prior to modifying a rule in the set of network service rules, the conflict resolution mechanism is configured to clone the rule to ensure that potential conflicts with rules that appear later in the set of network service rules are not overlooked.

22. The apparatus of claim 17, wherein the priority of a given rule is based upon one or more of the following:
   a priority associated with a network service from which given rule originated;
   a count of the number of prefix bits specified by the filter for the given rule; and
   a time stamp indicating when the given rule was incorporated into the set of network service rules.

23. The apparatus of claim 17, wherein an action specified by a network service rule can include, but is not limited to:
   dropping a packet;
   gathering statistical information about the packet;
   controlling timer functions associated with the packet;
   modifying the packet; and
   passing the packet on.

24. The apparatus of claim 17, wherein the multiple network services can include, but is not limited to:
  a firewall service;
  a service level agreement monitoring service;
  a load balancing service;
  a transport matching service;
  a failover service; and
  a high availability service.

* * * * *

UNITED STATES PATENT AND TRADEMARK OFFICE
CERTIFICATE OF CORRECTION

| | | |
|---|---|---|
| PATENT NO. | : 7,441,022 B1 | Page 1 of 1 |
| APPLICATION NO. | : 10/800091 | |
| DATED | : October 21, 2008 | |
| INVENTOR(S) | : Christoph L. Schuba et al. | |

It is certified that error appears in the above-identified patent and that said Letters Patent is hereby corrected as shown below:

In claim 1 (column 15, line 49), please change the word "networking" to the word --network--.

Signed and Sealed this

Tenth Day of February, 2009

JOHN DOLL
*Acting Director of the United States Patent and Trademark Office*